June 13, 1961 E. H. GATZERT 2,988,602

FINAL SELECTOR FOR A TELEPHONE SYSTEM

Filed Dec. 27, 1955 11 Sheets-Sheet 1

June 13, 1961 E. H. GATZERT 2,988,602

FINAL SELECTOR FOR A TELEPHONE SYSTEM

Filed Dec. 27, 1955 11 Sheets-Sheet 2

INVENTOR.
ERNEST H. GATZERT

BY Henry H. Gage
AGENT

June 13, 1961 E. H. GATZERT 2,988,602

FINAL SELECTOR FOR A TELEPHONE SYSTEM

Filed Dec. 27, 1955 11 Sheets-Sheet 3

June 13, 1961 E. H. GATZERT 2,988,602

FINAL SELECTOR FOR A TELEPHONE SYSTEM

Filed Dec. 27, 1955

11 Sheets-Sheet 5

June 13, 1961 E. H. GATZERT 2,988,602

FINAL SELECTOR FOR A TELEPHONE SYSTEM

Filed Dec. 27, 1955 11 Sheets-Sheet 7

June 13, 1961 E. H. GATZERT 2,988,602

FINAL SELECTOR FOR A TELEPHONE SYSTEM

Filed Dec. 27, 1955 11 Sheets-Sheet 9

June 13, 1961 E. H. GATZERT 2,988,602

FINAL SELECTOR FOR A TELEPHONE SYSTEM

Filed Dec. 27, 1955 11 Sheets-Sheet 11

Patented June 13, 1961

2,988,602

FINAL SELECTOR FOR A TELEPHONE SYSTEM

Ernest H. Gatzert, Rochester, N.Y., assignor to General Dynamics Corporation, a corporation of Delaware
Filed Dec. 27, 1955, Ser. No. 555,441
5 Claims. (Cl. 179—18)

Figure 1A:
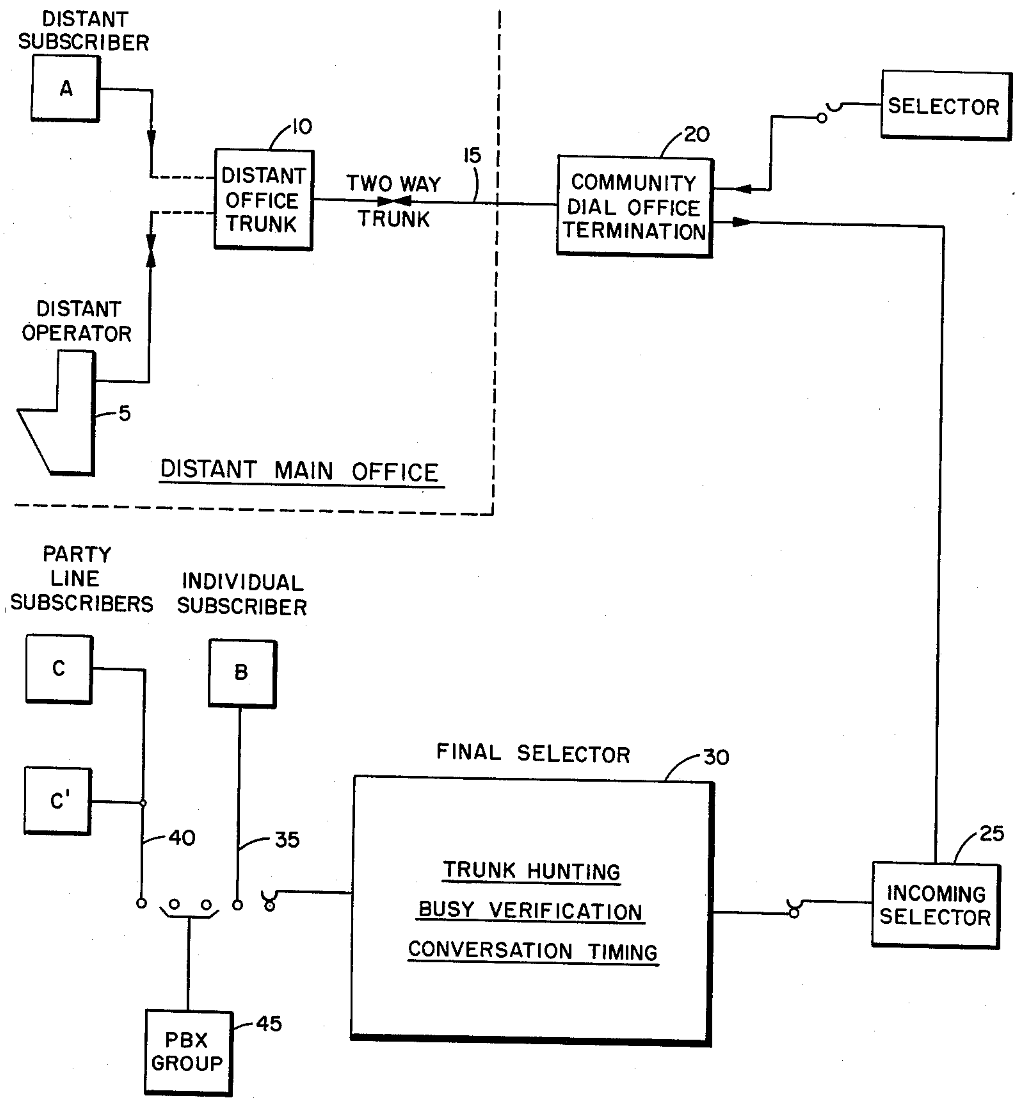

My invention relates to telephone systems in general, and more particularly to final selectors for use in telephone systems.

In the past it has been the practice to provide a final selector suitable for use in extending connections to a called line from either free service or toll classes of calling lines. Such final selectors have been equipped to give trunk hunting service for selecting an idle one of a group of lines to a private branch exchange following the selection of the first line of the group. Such final selectors have also been arranged to give verification service on calls extended from an operator position in the event that the called line is busy in response to the dialing of a particular preliminary signal prior to the transmission of switch directing signals. Such selectors have usually been equipped to give verification service on only one line in the group, such as the first or the last.

Accordingly, it is an object of my invention to provide a new and improved final selector.

Another object of my invention is to provide a final selector of the preliminary digit verification type which is capable of extending verification connections to any one of a group of private branch exchange trunks.

I accomplish these and other objects by providing a selector comprising a set of wipers suitable for engaging any one of a plurality of terminal sets. Each of the terminal sets is capable of being placed in a busy or an idle condition and certain successive ones of the terminal sets are arranged to form a group. Means comprising a magnet within the selector is operative in response to the transmission to the selector of directive signals for selectively advancing the wiper set into engagement with any one of the terminal sets. In the event that the selected terminal set is in idle condition, means within the selector is operative for extending a connection from the selector to the selected terminal set. In the event that the selected terminal set is in busy condition, means is provided for rendering the connection extending means inoperative in order to prevent the extension of a call to a busy line by normal methods.

In the event that the selected one of the terminal sets is within the above-referred to group of terminals, means within the selector is operative in response to a busy condition on the selected set for causing the advancing means to further advance the wiper set into engagement with the next succeeding one of the terminal sets within the group. In order to make it possible for a verification connection to be extended to any one of the terminal sets, means operative in response to the transmission of the preliminary directive signal is provided for preparing the selector to extend thereafter a connection from the selector to a selected busy terminal set. In order to make it possible to extend a verifying connection to any one of the terminal sets within the group, the selector includes means operative in response to the operation of the preparing means for rendering the trunk hunting means ineffective.

Further objects and advantages of my invention will become apparent as the following description proceeds, and features of novelty which characterize the invention will be set forth and pointed out with particularity in the claims annexed to and forming a part of this specification. For a better understanding of my invention reference may be had to the accompanying drawings in which FIGURE 1A shows a block diagram of a typical telephone system using this invention.

Figures 1, 12:
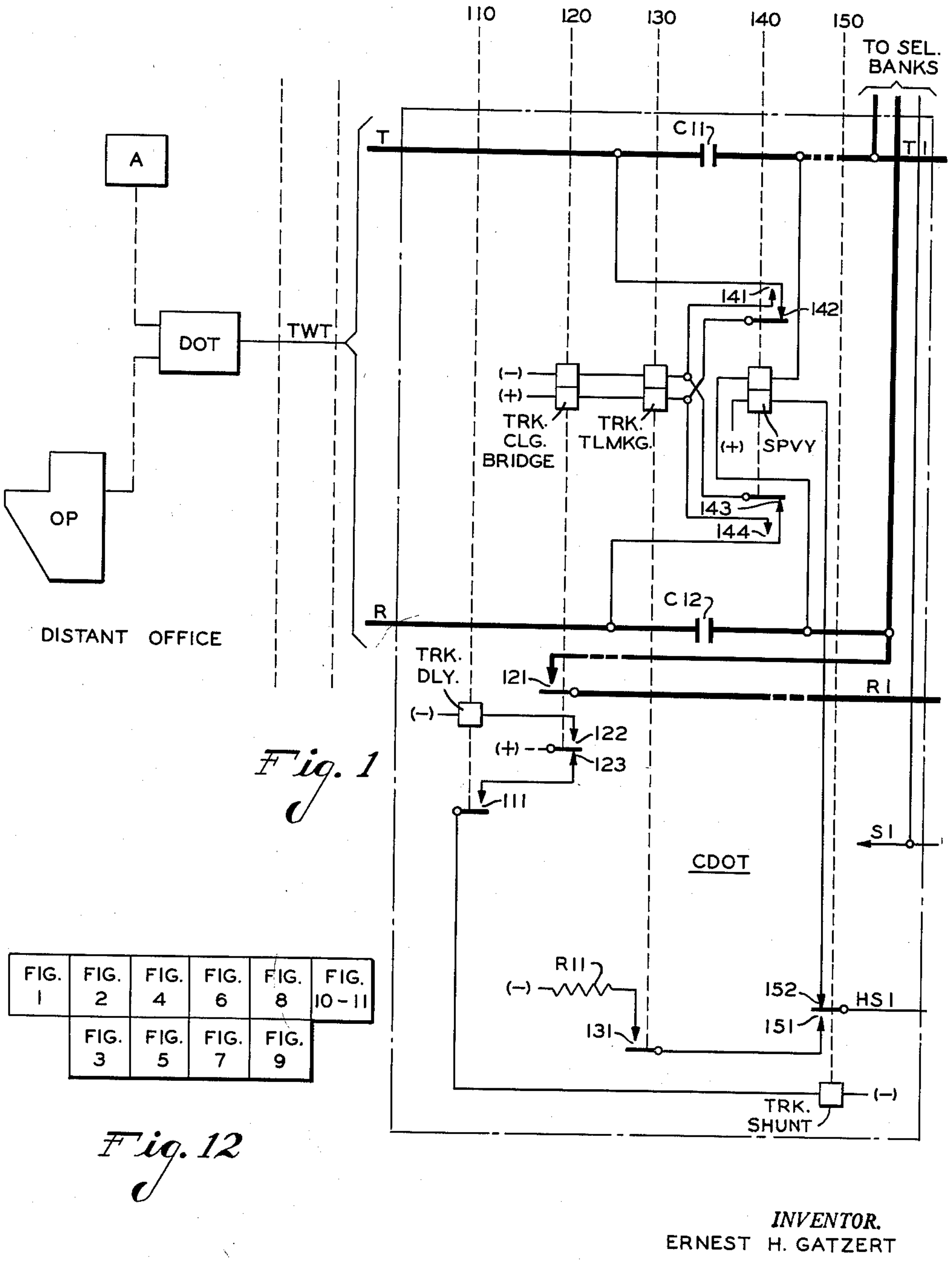
Figure 2:
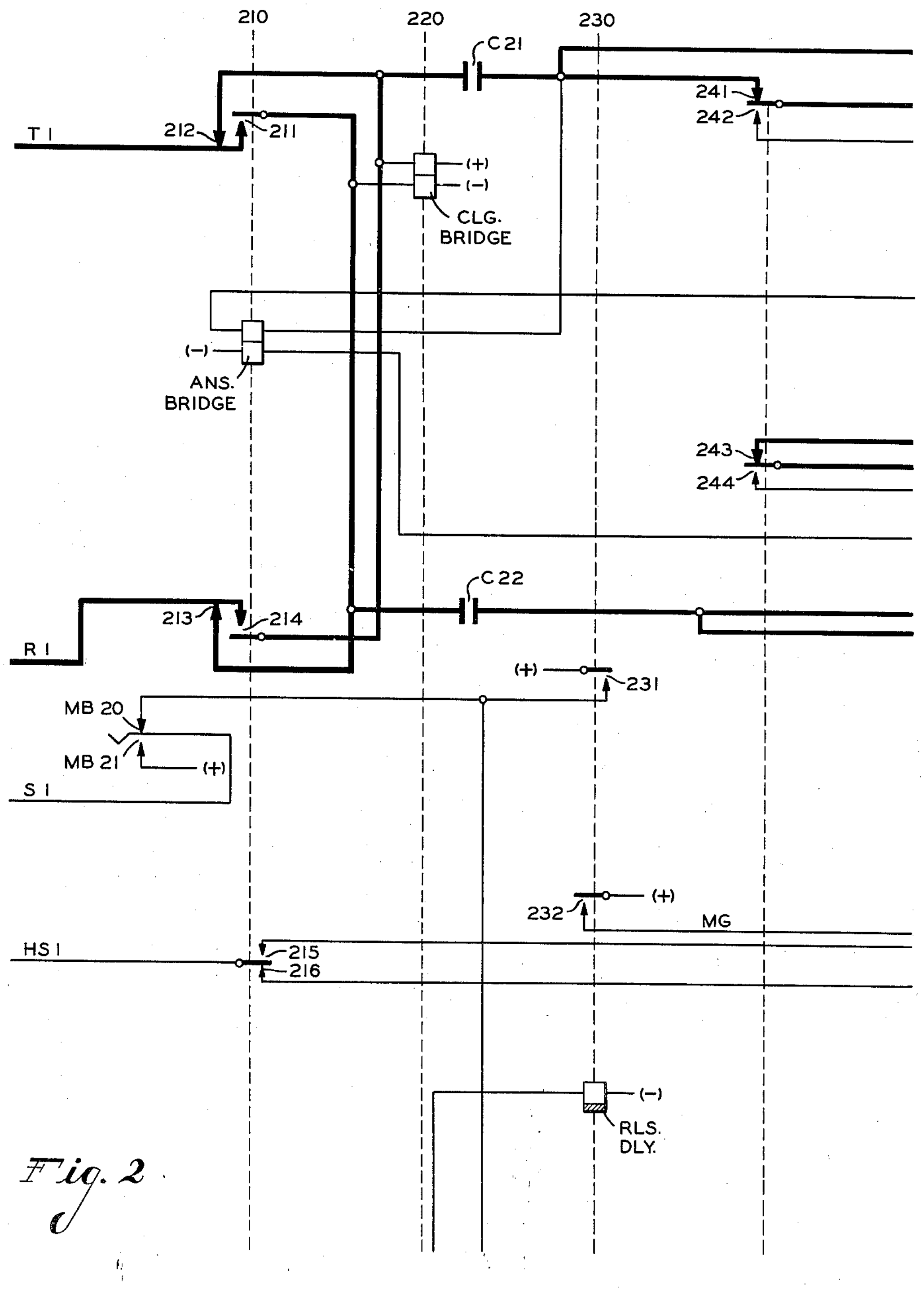
Figure 3:
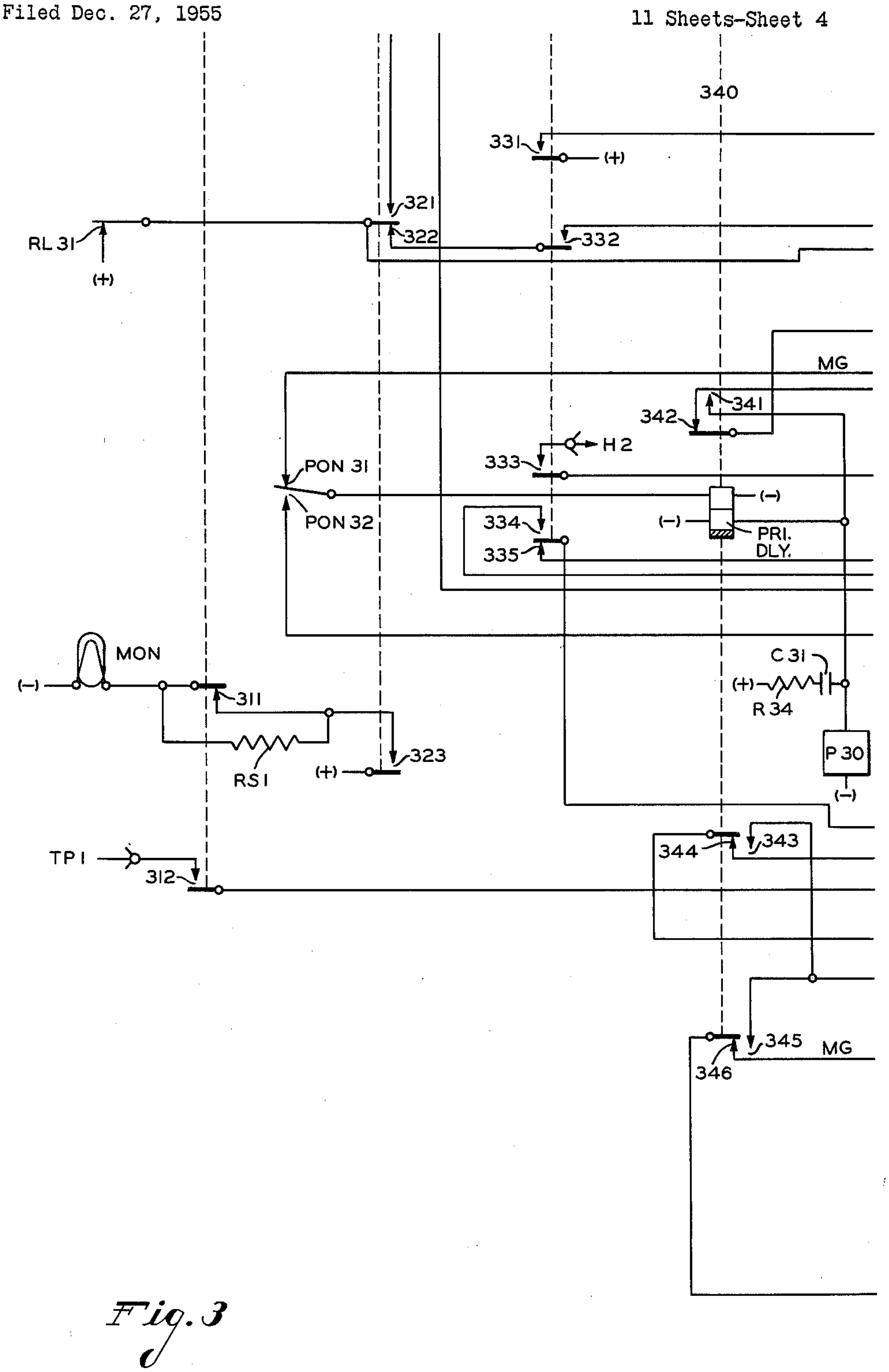
Figure 4:
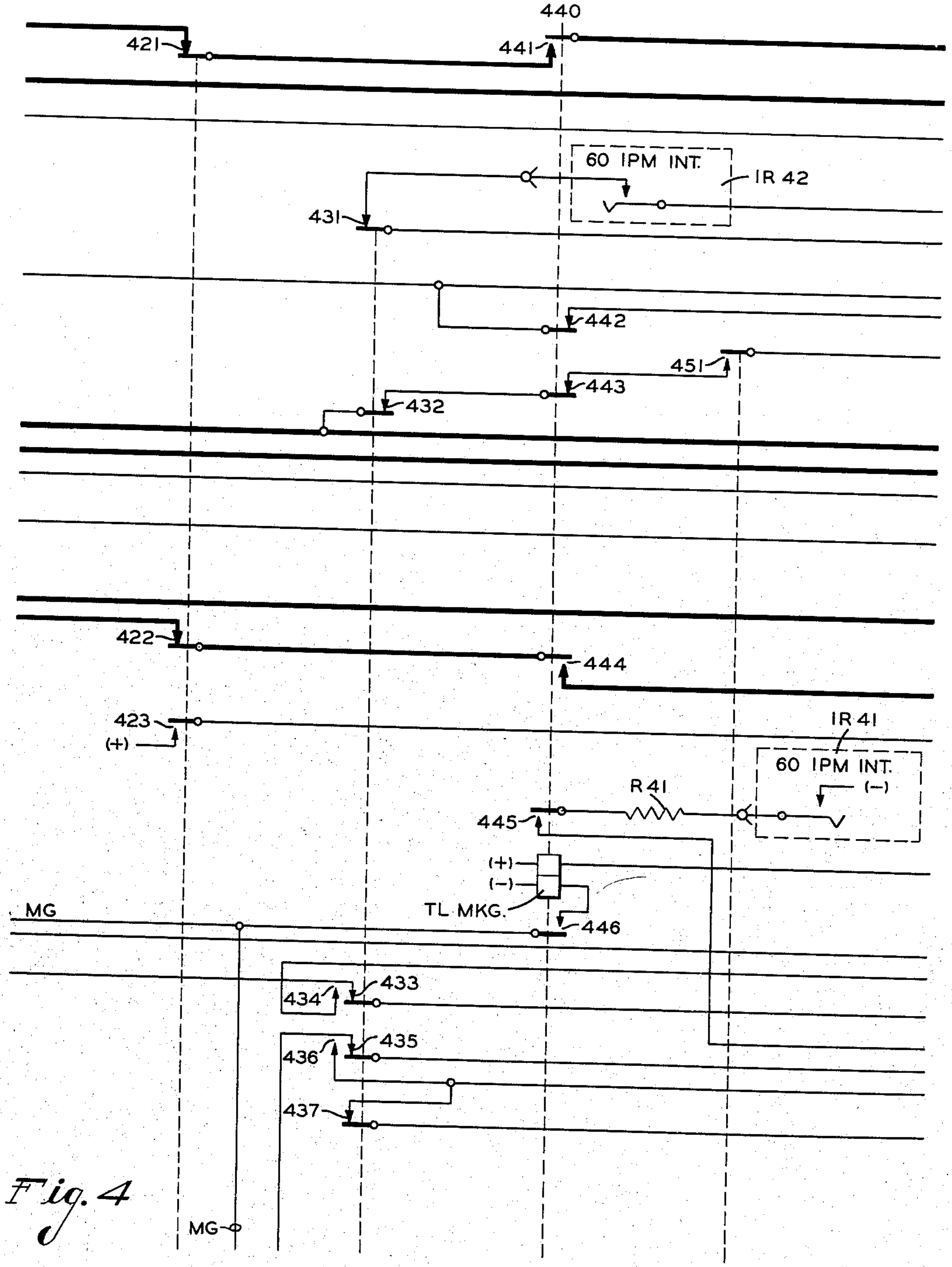
Figure 5:
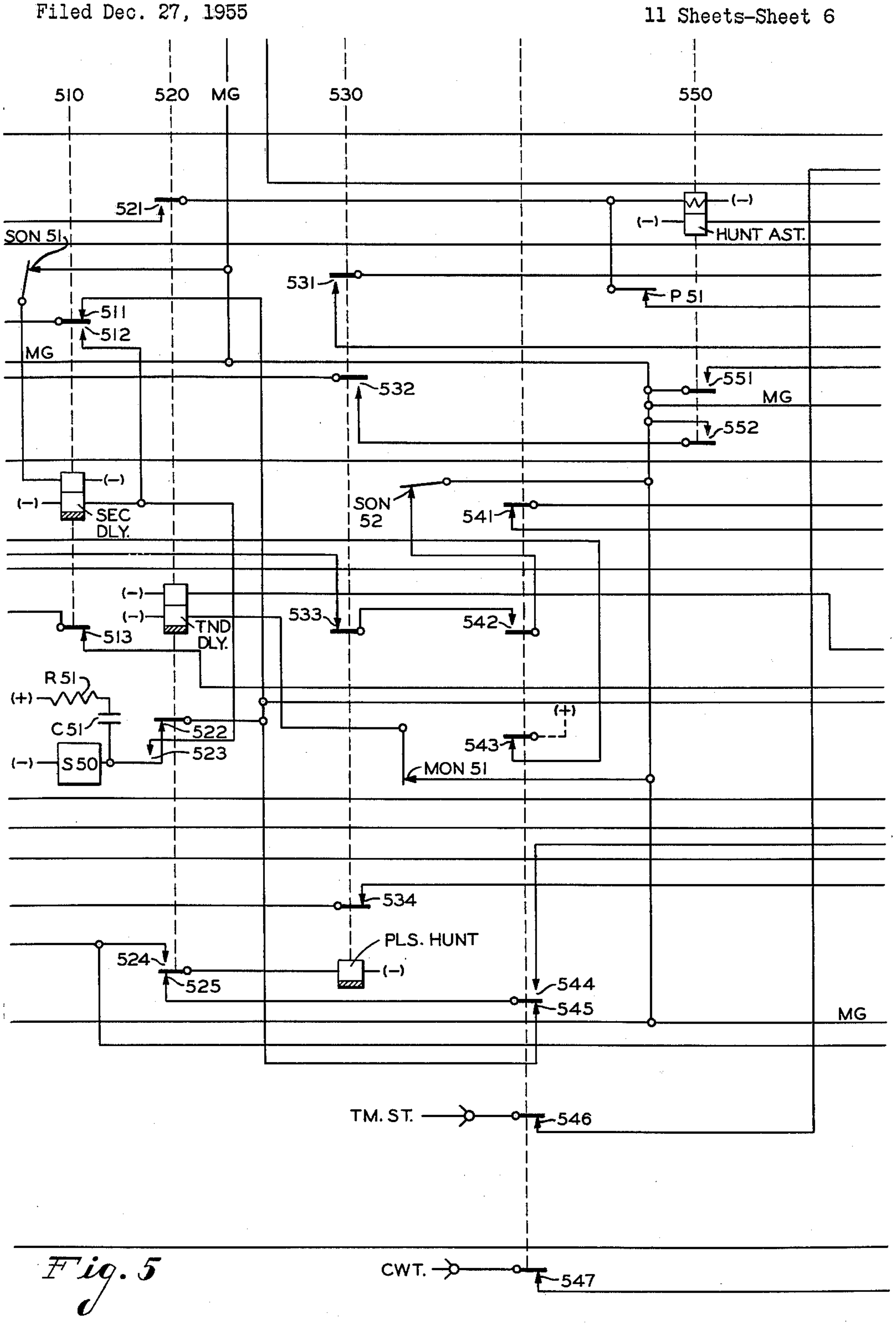
Figure 6:
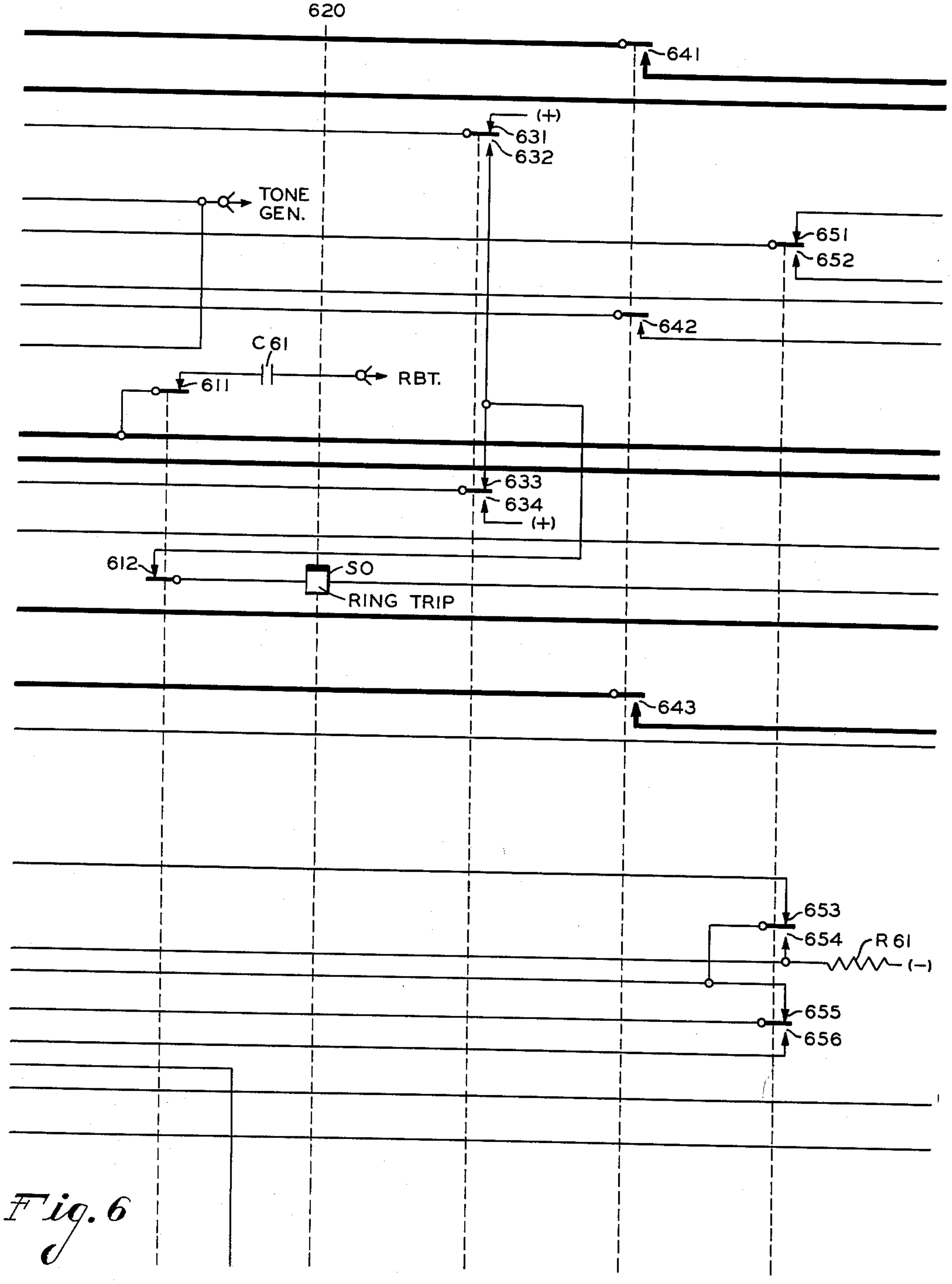
Figure 7:
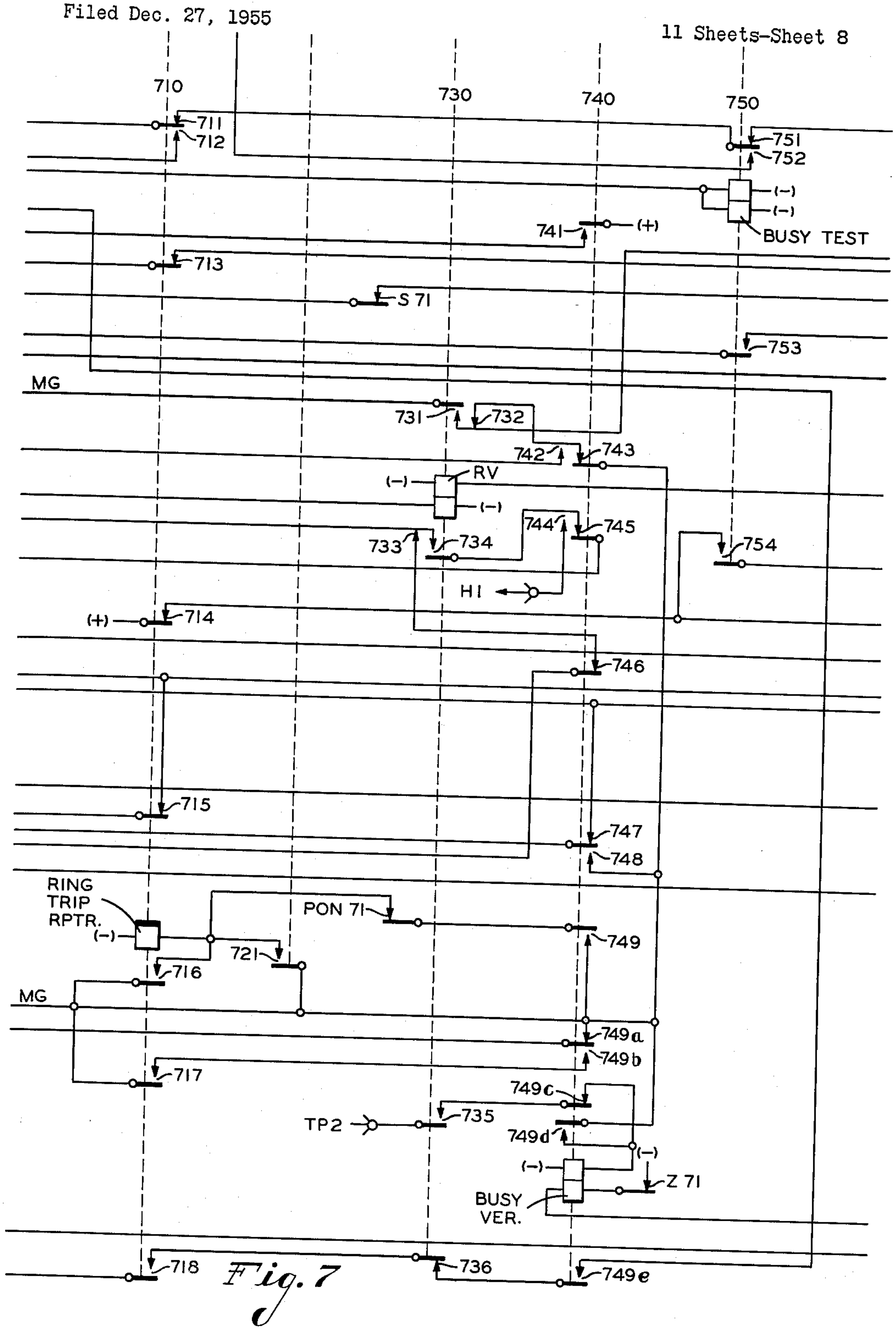
Figure 8:
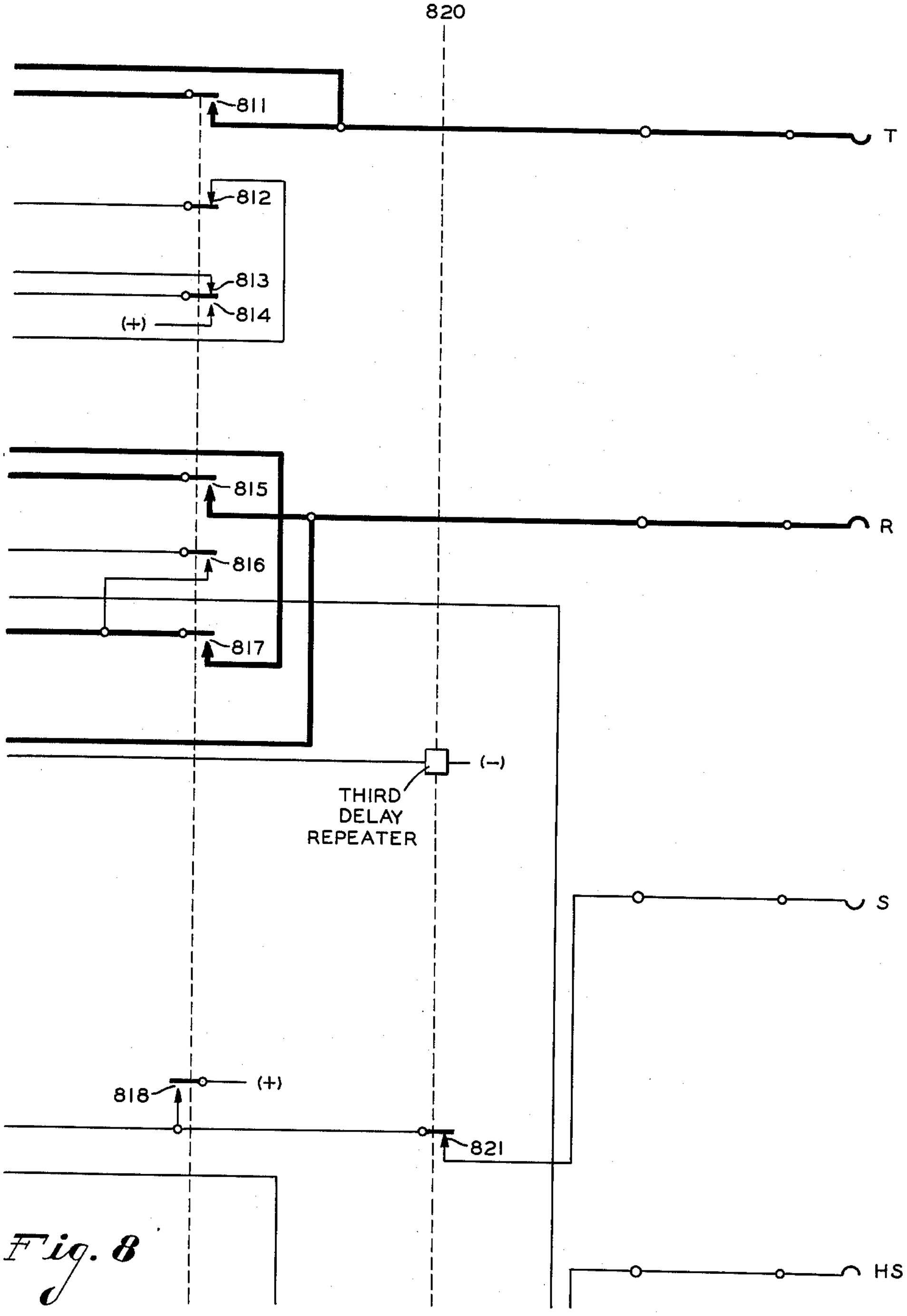
Figure 9:
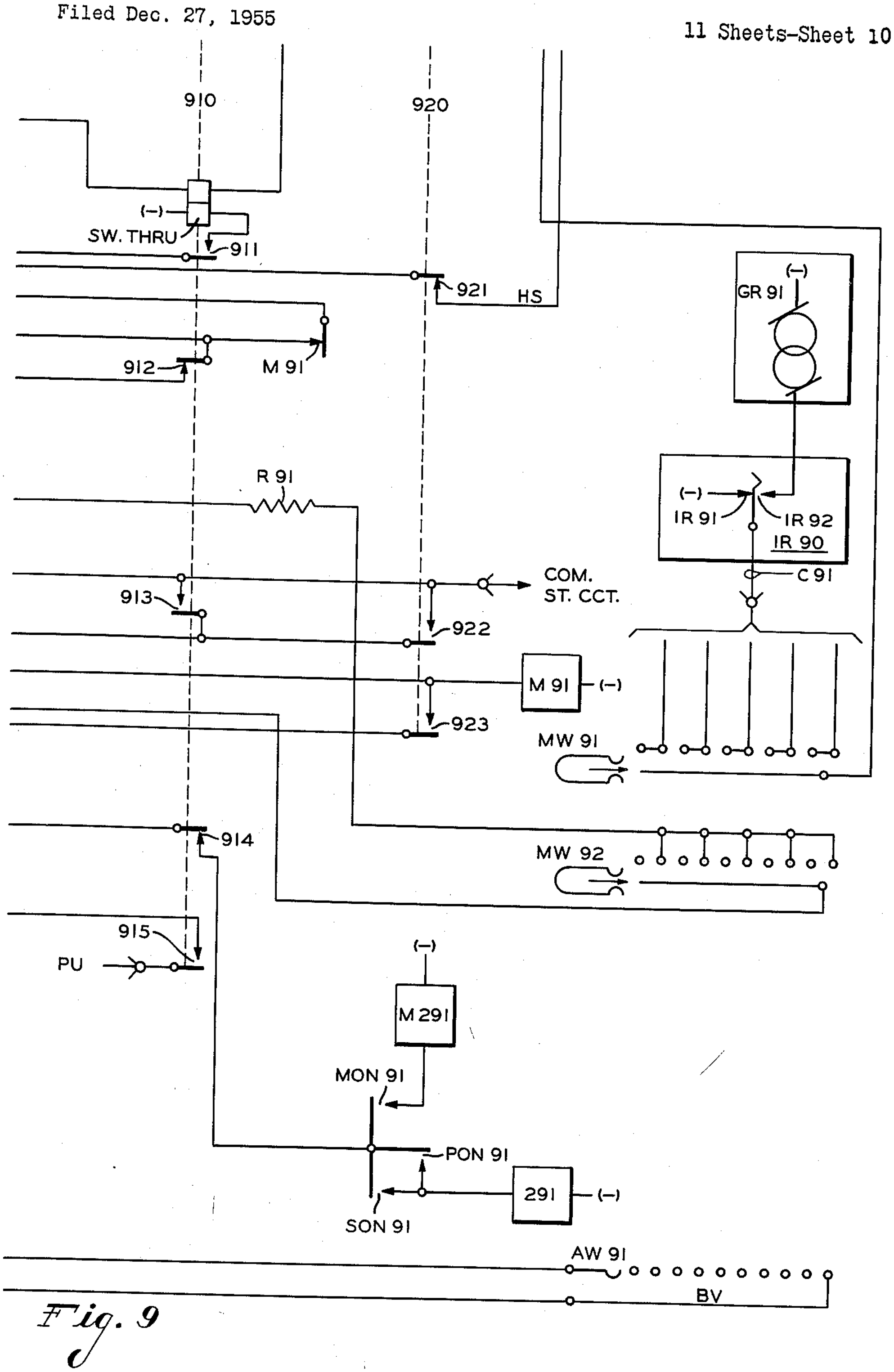
Figures 10, 11:
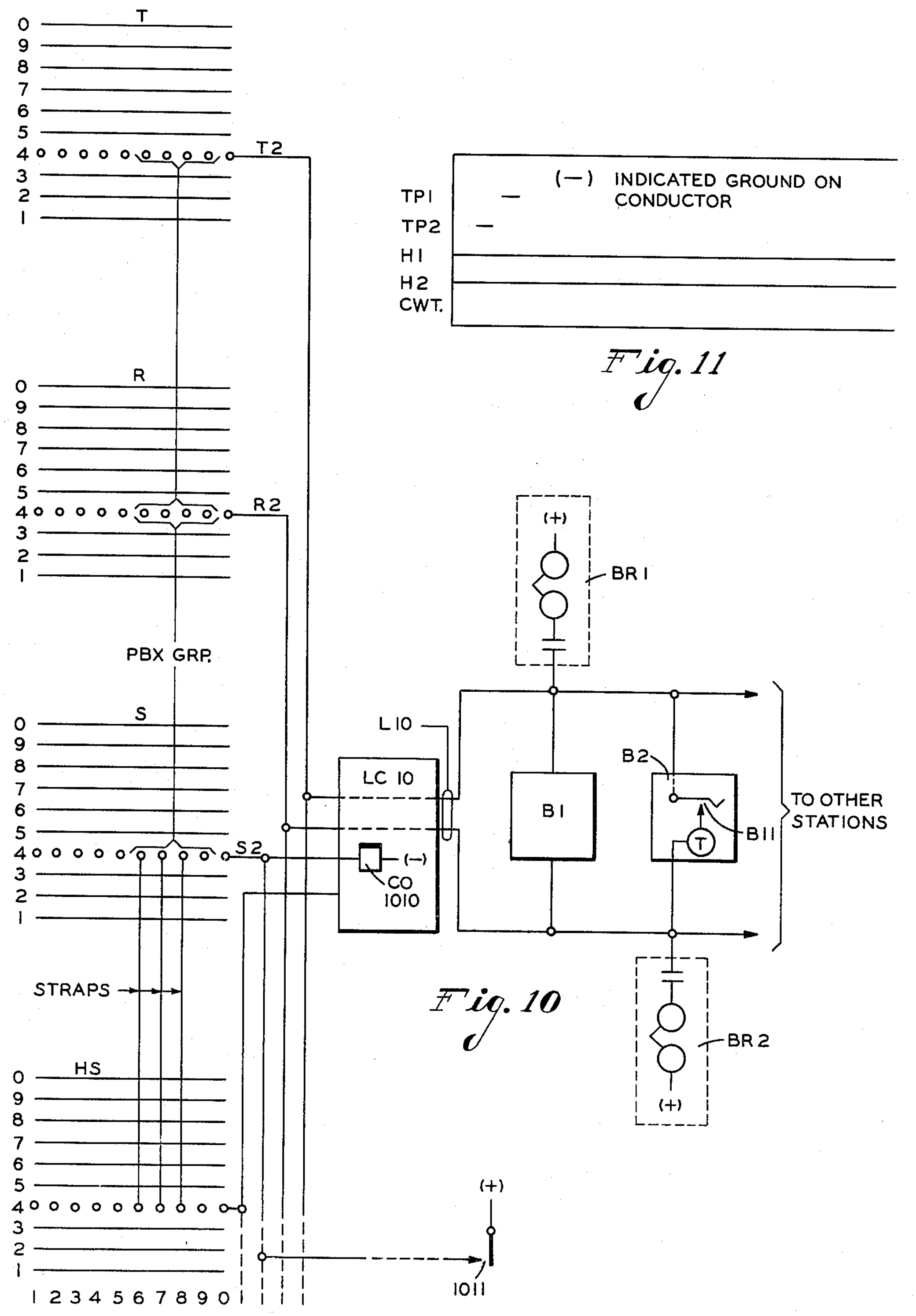

FIG. 1 shows in block form a main dial office and a two-way trunk, and in skeletonized form a community dial office termination for the trunk, FIGS. 2–10 show a final selector switch accessible from the termination in FIG. 1, FIG. 11 shows a timing chart, FIG. 12 shows the relationship between FIGS. 1–10.

Part of the equipment set forth in the following description is made to function from energy supplied from a first source such as a battery. The most negative ungrounded plate of the battery is referred to hereafter as "battery" and symbolically as (—). The most positive grounded plate of the battery is hereafter referred to as "ground" and symbolically as (+).

Another part of the equipment is made to function from energy supplied from a series of alternating current generators, collectively shown in the drawings as GR91, one side of which are grounded.

EXTENSION OF A CALL FROM A DISTANT OFFICE STATION

Referring to FIG. 1A, the final selector 30 forming the preferred embodiment of my invention is suitable for use as an extended area service selector. Thus, stations such as A in a distant main office may extend connections by means, not shown, to an outgoing two-way distant office trunk 10 and thence over a two-way trunk line 15 to the two-way incoming community dial office termination 20 which has associated therewith an incoming selector 25. By directive pulses, the incoming selector 25 can be caused to hunt for and seize an idle final selector 30 to step to and signal an individual subscriber B on a line such as 35; or to selectively signal either subscribers C and C′ on party line 40; or to hunt for and seize an idle line to a P.B.X.

Final selector 30 may also be seized by an operator at the distant main office from her switchboard 5 in which case the community dial office termination 20 provides special toll marking to the final selector 30 thereby permitting the operator to cancel the conversation timing feature and to make use of the busy verification feature so that she can selectively override a busy condition on any individual line, party line, or P.B.X. line accessed by final selector 30.

Because the apparatus preceding final selector 30 is not a part of this invention and such apparatus is well understood by those skilled in the art, a detailed description of its operation is not included herein. However, a portion of the equipment in the community dial office termination 20 is shown in FIG. 1 in order to show the means of distinguishing between subscriber and operator seizure of the community dial office termination 20.

Referring now to FIG. 1, the community dial office termination may be seized by the well known expedient of closing a loop between conductors T and R. The closed loop between conductors T and R is effective for completing an operating circuit for trunk calling bridge relay 120 over the following route: from ground, through the lower winding of relays 120 and 130, break contacts 142, conductor T, the short in termination DOT, conductor R, break contacts 143, and the upper windings of relays 130 and 120 to battery. Relay 120 thereupon operates. Relay 130, being differentially wound, remains unoperated at this time.

The operation of relay 120 is effective for bringing about the seizure of the final selector shown in FIGS. 2–10 in a manner to be described presently. The operation of relay 120 is also effective for operating trunk delay relay 110 by closing an obvious operating circuit for energizing relay 110 at make contacts 122.

*Seizure of the final selector*

The selector shown in FIGS. 2–10 is seized in response to the operation of relay 120 by placing a short between conductors T1 and R1 of the selector. The creation of the short is effective for operating calling bridge relay 220 by completing the following operating circuit: from ground, through the upper winding of relay 220, break contacts 212, conductor T1, the upper winding of trunk answering bridge relay 140, make contacts 121, conductor R1, break contacts 213, and the lower winding of relay 220 to battery. Relay 220 thereupon operates. The operation of relay 220 is effective for completing a circuit for operating release delay relay 230 which is traced as follows: from ground, through break contacts RL31, make contacts 321, and the winding of relay 230 to battery. Relay 230 is thereupon operated.

The operation of relay 230 is effective for placing ground on the master ground conductor MG at make contacts 232. The operation of relay 230 is also effective for placing ground on sleeve conductor S1 over the following circuit: from ground, through make contacts 231, break contacts MB20 and conductor S1. This marks trunk line TWT as busy to equipment within the community dial office which has access to trunk line TWT from the selector banks.

The grounding of conductor MG is effective at this time for causing the operation of primary delay relay 340, secondary delay relay 510, and third delay relay 520. The circuit for operating relay 340 is traced from grounded conductor MG, through primary off-normal contacts PON31, and the upper winding of relay 340 to battery. The operating circuit for relay 510 is traced from grounded conductor MG, through secondary off-normal break contacts SON51 and the upper winding of relay 510 to battery. The operating circuit for relay 520 is traced from grounded conductor MG, through minor switch off-normal break contacts MON51 and the lower winding of relay 520 to battery. The operation of relays 340, 520 and 530 is effective for preparing an energizing circuit for the means comprising primary magnet P30 for advancing the wiper set including wipers T, R, S and HS in their primary direction. This energizing circuit is to be traced presently.

The operation of relay 520 is also effective for operating pulse hunt relay 530 and third delay repeater relay 820. Relay 530 is operated over the following circuit: from grounded conductor MG, through make contacts 345, make contacts 524 and the winding of relay 530 to battery. An alternate circuit for operating relay 530 is completed from grounded conductor MG through break contacts 749*a* and make contacts 524 to the winding of relay 530. Relay 820 is operated over an obvious circuit including make contacts 423.

At this time a connection has been extended from distant office station A over trunk line TWT conductors T and R, to the communication channel of the final selector which includes conductors T1 and R1 and blocking capacitors C21 and C22. Seizure of the final selector is now complete and the selector is ready to receive directive signals transmitted from calling station A.

*The impulsing circuit*

The directive signals or digits for operating the final selector comprise the well known train of interruptions in the above-traced operating circuit of relay 120 so that relay 120 is released and reoperated in response to the receipt of each impulse in each train. It is to be noted that trunk delay relay 110 is of the slow release type and that the release of relay 120 in response to the receipt of an impulse over trunk line TWT is of insufficient duration to allow the release of relay 110 even though the operating circuit for relay 110 is opened at make contacts 122. The repetition of impulses by relay 120 is also effective for repeating each received impulse train into the final selector by impulsing the above-traced operating circuit of relay 220 at make contacts 121. Relay 220 therefore repeats each train of impulses received and repeated by relay 120.

The repetition of impulses by relay 220 is effective for impulsing the winding of hunt assist relay 550. Thus upon each release of relay 220, a circuit is completed from ground, through break contacts RL31 and 322, make contacts 332 and 521, and the upper winding of relay 550 to battery. Relay 550 thereupon operates and locks up over the following circuit: from grounded conductor MG, through make contacts 551, break contacts 912, M91, S71 and P51, and the upper winding of relay 550 to battery. The locking up of relay 550 allows the latter relay to remain in its operated condition even though the pulse repeating means comprising relay 320 is restored to its normal operated condition.

The operation of relay 550 is effective for energizing the primary, secondary, and minor switch advancing means in a manner to be described presently. Also in a manner to be described presently, the operation of any one of the advancing magnets such as P30, 550 or M91 is effective for operating break contacts P51, S71 or M91 in order to open the above-traced locking circuit for relay 550. Upon the opening of its locking circuit, relay 550 is restored to its normal condition and is ready to operate in response to the next impulse repeated by relay 220.

*Transmission of the first directive signal*

The final selector which forms the preferred embodiment of my invention comprises a set of wipers including T, R, S and HS having a normal, unoperated position. These wipers are arranged to be advanced away from their normal position in a primary direction in response to the receipt of a first directive signal transmitted from the calling point for selecting any one of a number of levels within which sets of terminals are disposed for engagement by the wiper set. The wiper set may thereafter be advanced in its secondary direction within the selected one of the levels, so that the wipers engage any one of the terminal sets on which lines such as L10 are terminated.

The first digit transmitted from the calling station A over trunk TWT through termination CDOT, and repeated by relays 220 and 550 in the previously described manner, if effective for causing the primary advancing means comprising magnet P30 to be energized one time in response to each impulse or digit in the train of impulses which comprise the directive signal. Upon each operation of relay 550 in the above-described manner and in response to the operation of relays 340, 510 and 520, the circuit for energizing magnet P30 is completed. The energizing circuit is traced from grounded conductor MG, through make contacts 552, 532 and 341, and the winding of magnet P30 to battery. The lower winding of relay 340 is also energized in parallel with the magnet at this time. Each energization of magnet P30 is effective for advancing the wipers one step away from their normal position in the primary direction. In response to the advance of the wipers the first step away from their normal position means comprising primary off-normal contacts are operated.

The operation of the primary off-normal contacts is effective for opening the above-traced energizing circuit for the upper winding of relay 340 at break contacts PON31. Thereafter relay 340, a slow release type, is maintained in its operated condition owing to the intermittent energization of its lower winding so long as the first train of impulses is being transmitted to magnet P30. When the repetition of the impulse train by relay 550 is concluded, relay 550 comes to rest in its normal condition in the above-described manner. The release of relay 550 opens the energizing circuit for magnet P30 and the lower winding of relay 340. Relay 340 thereupon releases. At this time, the wipers including T, R, S and HS have been advanced to the level corresponding to the first digit transmitted.

*Transmission of the second digit*

The transmission of the second digit in a manner similar to the one described in the case of the first digit is effective for intermittently energizing the secondary advancing means comprising magnet S50. Each energization of the magnet is effective for advancing the wiper set within the selected one of the levels and into engagement with the required set of terminals to which a connection is to be extended.

Upon each operation of relay 550 during the transmission of the second directive signal and in response to the operation of relays 530 and 510 and to the release of relay 340 an energizing circuit for magnet S50 is completed as follows: from grounded conductor MG, through make contacts 552 and 532, break contacts 342, make contacts 512 and 523, and the winding of magnet S50 to battery. The lower winding of relay 510 is energized over an obvious circuit in parallel with magnet S50. Each energization of magnet S50 is effective for advancing the wiper set one additional step within the selected level. Thus the repetition of a second directive signal by relay 550 is effective for advancing the wiper set into engagement with the terminal set corresponding to the number of impulses in the second digit. For the present it is assumed that the wiper set has been advanced to the point where wipers T and R engage the terminals to which conductors T2 and R2 of line L10 are connected. The advance of the wipers in their secondary direction is effective for operating means comprising secondary off-normal contacts. The operation of the secondary off-normal contacts is effective for opening the above described circuit for energizing the upper winding of relay 510 at break contacts SON51. Thus after the advance of the wiper set one step in the secondary direction, relay 510 is maintained in its operated condition by the intermittent energization of its lower winding in parallel with magnet S50. Relay 510, being a slow release type, does not release until the impulsing operation of relay 550 has stopped.

*Transmission of the third signal*

Means within the selector comprising a minor switch is effective for selecting any one of a number of ringing frequencies or codes to be applied to the line to which a connection has been extended from the selector. These frequencies or codes are generated by means shown collectively as generator GR91 and interrupter IR90. They are extended through conductors shown collectively as R91 to the terminal bank of the minor switch to which wiper MW91 has access.

The transmission of the third directive signal to the final selector is effective in the previously described manner for causing relay 550 to repeat the signal. Each operation of relay 550 is effective for energizing means comprising minor switch magnet M91 for advancing the minor switch wipers MW91 and MW92 into engagement with the next succeeding terminal set of the minor switch. The energizing circuit is completed in response to the operation of relay 520 and to the release of relays 340 and 510 and is traced from grounded conductor MG, through make contacts 552 and 532, break contacts 342 and 511, make contacts 923 and magnet M91 to battery. The upper winding of relay 520 is energized in parallel with magnet M91 over an obvious circuit. The advance of the minor switch wipers away from their normal position is effective for operating means comprising minor off-normal switch contacts. The operation of the off-normal contacts is effective for opening the above-traced circuit for energizing the lower winding of relay 520 at break contacts MON51. Relay 520, being of slow release type, is maintained in its operated condition during the intermittent energization of its upper winding over the above-traced circuit during the transmission of the third directive signal.

Following the end of the transmission of the third impulse train to the final selector, relay 550 comes to rest in its normal condition thereby opening at make contacts 552 the energizing circuit for maintaining relay 520 in its operated condition. Relay 520 thereupon releases and opens the previously traced operating circuit for relay 820 at make contacts 423 and relay 530 at make contacts 524. Relay 820 releases. Relay 530, being a slow release type, remains in its operated condition for some time following the release of relays 520 and 820.

*Busy test and switch-through*

Each of the terminal sets to which the wiper sets comprising T, R, S and HS of the final selector has access is capable of assuming an idle or a busy condition according to whether or not the corresponding line connected to the terminal set is in use. An idle condition is indicated by the presence of battery on the terminal engaged by wiper S. In the event that the corresponding line is in use, a busy condition is indicated at the terminal set by the application of ground to the terminal engaged by wiper S by means such as contacts 1011.

Following the end of the transmission of the third directive signal to the final selector and during the time that relay 530 is in its operated condition means comprising busy test relay 750 is made operative for detecting a busy condition on the terminal set engaged by the wiper set. Relay 530 is made operative by extending an operating circuit for that relay from wiper S through break contacts 821, make contacts 436, and the winding of busy test relay 750 to battery. Assuming that the line is in idle condition, relay 750 remains in its unoperated condition. Thereafter relay 530 releases, opening the circuit of relay 750 at make contacts 436 and completing an operating circuit for means comprising switchthrough relay 910 for extending a connection from the talking channel of the final selector to the wipers and the terminal sets engaged by the wipers.

The operating circuit for relay 910 is traced from ground, through make contacts 331, break contacts 711 and 751, the upper winding of relay 910, break contacts 437 and 821, wiper S, the corresponding S terminal in the set engaged by the wiper set, a sleeve conductor such as S2, and the winding of a cutoff relay such as 1010 to battery. Current flowing through this circuit is sufficient to operate contacts 911 thereby closing a circuit for operating relay 910 completely. The circuit for completely operating relay 910 is traced from grounded conductor MG, through break contacts 743 and 732, make contacts 911, and the lower winding of relay 910 to battery.

The operation of relay 910 is effective for closing a circuit from conductors such as T2 and R2, through the terminal set in the final selector bank, wipers T and R, to the talking channel of the final selector at make contacts 811 and 815. The operation of relay 910 is also effective for applying direct ground to the sleeve conductor, such as S2, connected to the terminal set engaged by wiper S over make contacts 818 and break contacts 821 in order to mark the terminal set and the corresponding line as busy to other equipment in the community dial office and to operate the cutoff relay, such as 1010, of the engaged line circuit.

Assuming that a busy condition exists on the terminal set engaged by the wipers at the time that the transmission of the third directive signal is completed, ground encountered by wiper S is transmitted over the previously traced circuit to the winding of relay 750 which thereafter operates. The operation of relay 750 is effective for preventing the subsequent operation of the connection extending means comprising relay 910 by opening the previously traced operating circuit for the upper winding of relay 910 at break contacts 751. The operation of relay 750 is also effective for transmitting an interrupted signal over the incoming HS1 conductor for intermittently energizing the lower winding of relay 140. The circuit is traced from battery, through the 60 impulse per minute interrupter contact IR41, resistor R41, make contacts 445 and 656, break contacts 433 and 216, conductor HS1, break contacts 152, and the lower winding of relay 140 to ground. Relay 140 thereupon is intermittently operated to pass back flashing reverse battery supervision to the distant office. The operation of relay 750 is also effective for applying busy tone to the talking connection which has been extended from the calling subscriber line from the tone generator (not shown) through 60 impulse per minute contacts IR42, break contacts 431, make contacts 652, break contacts 813, the upper winding of relay 210, blocking capacitor C21, conductor T1, over the previously described talking circuit of the calling subscriber's line by way of trunk line TWT back through conductor R to ground through break contacts 143 and the lower windings of relays 130 and 120.

The operation of relay 750 is also effective for completing a holding circuit for itself which is effective following the release of relay 530. The holding circuit is traced from ground, through make contacts 331, break contacts 711, make contacts 752, break contacts 435, and the winding of relay 750 to battery. The holding of relay 750 in its operated condition is effective to return the busy tone and the intermittent reverse battery supervision over trunk line TWT so long as the final selector is held operated.

*Trunk hunting*

Certain successive terminal sets within any one of the levels to which the wiper set of the final selector has access may be arranged in a group for terminating a corresponding group of lines such as a line to a private branch exchange. In order to make it unnecessary for a calling subscriber to transmit a separate directive signal to the final selector for operating the wiper set into engagement with each individual terminal set in the group means is provided to respond in the event that the first terminal set engaged by the wiper set is in busy condition for causing the wiper set to be advanced into engagement with the next succeeding terminal set within the group until an idle terminal set is found or until the final terminal set in the group is encountered by the wipers. In the preferred embodiment of my invention each terminal set except for the last in such a group is indicated by a strap running between the busy or idle condition indicating sleeve terminals engaged by wiper S and the corresponding HS terminal. In the case of the last set in the group the strap is omitted.

Assuming that the wiper set has been advanced into engagement with the first terminal set in such a group within one of the levels such as the one indicated in level four, lines 6—9 inclusive, and further that the first two sets are in busy condition as indicated by the presence of ground on the terminals engaged by wiper S in the previously described manner, a circuit is completed for reoperating hunt assist relay 550 which in turn is effective for energizing the secondary advancing means to advance a wiper set into engagement with terminal sets for line 7, and thereafter, if necessary, line 8. When wiper S is placed on the busy indicating terminals of the first set in the group, previous to the release of relay 530 but after the release of relays 520 and 820, a circuit is completed for re-energizing hunt assist relay 550. The circuit is traced from ground, the terminal engaged by wiper S, the strap, the terminal engaged by wiper HS, wiper HS through break contacts 921 and 713, make contacts 531 and 753, break contacts M91, S71 and P51, and the upper winding of relay 550 to battery. Relay 550 thereupon operates.

The operation of relay 550 with relays 340, 510 and 520 in released condition is effective for reclosing a circuit for operating secondary magnet S50 in order to advance the wipers into engagement with the next succeeding set of terminals in the group. The circuit is traced from grounded conductor MG, through make contacts 552 and 532, break contacts 342, 511 and 522, and the winding of magnet S50 to battery. The operation of magnet S50 is effective in the previously described manner for opening the circuit for operating relay 550 at break contacts S71. Relay 550 is thereupon released. The wiper set is now in engagement with the next terminal set in the group.

Upon the arrival of the wiper set at the next terminal set (7), the previously described busy test circuit is recompleted and in the event that the second line in the group is busy, the previously described reoperating circuit for relay 550 is recompleted through the corresponding strap between the S and the HS terminals of the engaged terminal set. During the advance of the wipers in this manner, relay 530 is maintained in its operated condition by the energization of its winding in parallel with the winding of magnet 50. The circuit is traced from break contacts 522 which was a part of the previously traced energizing circuit of magnet S50, through break contacts 545 and 525, and the windings of relay 530 to battery.

When the wipers have been advanced into engagement with a first or intermediate terminal set in such a group that is in idle condition, the absence of ground on the S and HS terminals prevents the operation of relay 750 over the previously traced operating circuit and allows the release of relay 530. The release of relay 530 completes the previously described operating circuit for switchthrough relay 910 so that relay 910 is operated at this time.

In the event that all of the lines in such a group are in busy condition, the wiper set is advanced in the previously described manner into engagement with the last set of terminals within the group. Under these conditions, busy test relay 750 is operated in the previously described manner. However, the absence of the strap between the S and HS terminals open the energizing circuit for reoperating relay 550 so that magnet 550 is not reenergized at this time. The opening of the 550 magnet circuit also opens the above described holding circuit for relay 530. Relay 530 thereupon releases to cause the busy test relay 750 to return busy tone to the calling point in the previously described manner.

*Signaling a station on a called line*

As previously described, the transmission of third (final) digit to the final selector is effective for causing means comprising the minor switch to select the particular ringing frequency or code which is to be extended to the called line. Following the transmission of the third signal and the operation of switchthrough relay 910 in the case of an idle line, means comprising primary delay relay 340 and reversing relay 730 are effective for connecting the selected frequency or code to the called line. Relay 340 is operated in response to the operation of relay 910 upon the appearance of a periodically generated ground signal transmitted over conductor PU. The circuit is traced from conductor PU through make contacts 915, break contacts 534, 344, 715, and 513, make contacts PON32, and the upper winding of relay 340 to battery. With relay 340 operated, the signalling circuit is traced from the terminal to which minor switch wiper MW91 has been advanced, through wiper MW91, the winding of ring-trip relay 620, break contacts 612 and (considering for the moment that reversing relay 730 is in its normal condition), break contacts 633, make contacts 244 and 815, wiper R, one of the pair of line conductors such as R2, through the ringers connected to conductor R2 such as BR2, to ground. Relay 320 is maintained operated over a locking circuit traced from grounded conductor MG through break contacts 749a, make contacts 343, break contacts 715 and 513, make contacts PON32 and the upper winding of relay 340 to battery.

In response to the signaling of the required station, the station telephone is removed from its hook switch thereby completing a short comprising the station transmitter such as T, and hookswitch contact B11 between conductors T2 and R2 of the line. The completion of such a short is effective for completing a direct current, off-hook signal path to operate signal tripping means comprising relay 320. The circuit is traced from ground, through the exchange battery, generator 91, interrupter contacts IR92, wiper MW91, the winding of relay 620, break contacts 612 and 633, make contacts 244 and 815, wiper R, conductor R2, transmitter T, hookswitch contact B11 of station B2, conductor T, wiper T, make contacts 811 and 242, and break contacts 631 to ground.

The operation of relay 620 is effective for operating ring trip repeater relay 710 over the following circuit: from grounded conductor MG, through make contacts 721 and the winding of relay 710 to battery. The operation of relay 710 is effective for closing an obvious locking circuit for itself from grounded conductor MG through make contacts 716.

The operation of relay 710 is also effective for opening the previously traced locking circuit for relay 340 at break contacts 715. Relay 340 thereupon releases. The operation of relay 710 is effective for opening the previously traced signaling circuit at break contacts 612.

Upon release of relay 340, a circuit is completed from the previously described extended connection from subscriber line A and including conductors T1 and R1 incoming to the final selector to the called line at break contacts 241 and 243.

The release of relay 340 is further effective for completing an operating circuit for answering bridge relay 210. This circuit is traced from ground through make contacts 814, the upper winding of relay 210, break contacts 241, make contacts 811, wiper T, a conductor of the called line such as T2, the hookswitch such as B11, and transmitter T of a called station such as B2, conductor R2, wiper R, make contacts 815, break contacts 243, make contacts 817 and 816 and the lower winding of relay 210 to battery. Current flowing through the above traced loop is sufficient to operate relay 210 at this time. The operation of relay 210 is effective to transfer incoming conductor HS1 from its previously described connection to ground to a battery connection at break contacts 216 and make contacts 217, respectively. The latter circuit is traced from make contacts 215 through resistor R61 to battery. The operation of relay 210 is also effective for reversing the flow of current through the loop for operating relay 220 and including conductors T1 and R1 at transfer contacts 211, 212 and 213, 214.

In the above paragraph the method for signaling the called line subscriber includes signaling over wiper R and the corresponding conductors connected to the one of the terminal sets engaged by wiper R. The called subscriber line also includes other stations such as B1 on line L10 which has a ringer connected between conductor T and ground. Accordingly, it is the function of relay 730 to select the wiper and the side of the line over which the signaling is to take place. The transfer contacts 631, 632 and 633, 634 are arranged so that the operation of relay 730 is effective to transfer the selected signaling generator which is extended to wiper MW91 from wiper R at break contacts 633 to wiper T at make contacts 632. Similarly the ground return path for operating the ring-trip relay 820 is transferred from the wiper T at break contacts 631 to the wiper R at make contacts 634 in response to the operation of relay 730.

The operation of relay 730 is under the selective control of the minor switch wiper MW92 which is arranged to complete an operating circuit for relay 730 upon the advance of the wiper to certain ones of the terminals to which it has access. In the preferred embodiment of my invention the leads from generator GR91 are connected to the minor switch bank terminals so that each output lead is applied to successive pairs of terminals comprising one odd and the succeeding even numbered terminal of the bank to which wiper MW91 has access. An operating circuit for relay 730 including any one of the even numbered terminals is completed in response to the movement of wiper MW92 to an even numbered terminal. Thus the selection of an even numbered terminal set by the minor switch wipers has the effect of applying the same frequency to the called line but to the opposite side as the advance of the wipers to the preceding set of terminals of the minor switch. The circuit for operating relay 730 is traced from grounded conductor MG through make contacts 345 and 343, break contacts 715, wiper W92, resistor R91 and the upper winding of relay 730.

*Conversation timing*

In the preferred embodiment of my invention, the final selector is provided with means for blocking connections established between a calling line, such as trunk line TWT and a called line, such as line 10, a predetermined interval of time following establishment of the connection which is indicated by the transmission of the off-hook signal from a station, such as B, on the called line to the final selector. Such an off-hook signal results in the operation of answering bridge relay 210 as noted in the preceding paragraphs. The means for controlling such blocking comprises a source of peridically generated impulses external to the final selector, which is effective for controlling the release of switchthrough relay 910. In order to render the external signal producing means effective, means comprising reverse relay 730 and verification relay 740 are effective for transferring the control of the holding circuit comprising the lower winding of switch-through relay 910 from the previously traced locking circuit including break contacts 732 and 743 to ground signals transmitted to the final selector over conductor H2 from the periodic impulse producing means.

In the preferred embodiment of my invention, the periodic impulse producing means has a cycle of two minutes duration. In order to block conversation between six and eight minutes after the connection to the called subscriber is established as indicated by the operation of relay 210, it is necessary to measure off two complete cycles of operations of the periodic signal producing means before placing the holding circuit of relay 920 under the control of signals passed forward over conductor H2. To this end, the periodic signal producing means produces various signals which are transmitted over conductors TP1 and TP2 and H2 in the relationship shown in FIG. 11 for operating the connecting means comprising relays 730 and 740.

In response to the operation of answering bridge relay 210, a circuit is completed between conductor TP1 and the lower winding of relay 730, which is traced from make contacts 312, break contacts 746, 733 and 541 and the lower winding of relay 730 to battery. Upon the appearance of the ground signal over conductor TP1, relay 730 operates and transfers its lower winding from the above described operating circuit to a locking circuit extending from battery through the lower winding of relay 730, break contacts 541, make contacts 734, break contacts 745 and make contacts 231 to ground.

The operation of relay 730 at this time is effective for transferring the lower winding of relay 910 from its previously described holding circuit to a holding circuit established from grounded conductor MG through make contacts 731 and 911 and the winding of relay 910 to battery. The operation of relay 730 is also effective for extending a connection between conductor TP2 and the winding of busy verification relay 740 that is traced from conductor TP2 through make contacts 735, break contacts 749_c_ and the upper winding of relay 740 to ground. At the start of the second cycle of operations of the signal producing means, the appearance of ground on conductor TP2 causes relay 740 to operate over the above traced circuit. The operation of relay 740 is effective for transferring the upper winding from the above traced operating circuit to an obvious connection to grounded conductor MG to make contacts 749_d_.

The operation of relay 740 is also effective for transferring the lower winding of relay 730 from its previously described holding circuit which includes break contacts 745 to a holding circuit from conductor H1 through make contacts 744, make contacts 734, break contacts 541 and the lower winding of relay 730 to battery. It is to be noted that at the time that the signal appears on conductor TP2, a ground signal is being transmitted over conductor H1 so that relay 730 is held steadily in its operated condition at this time. At the end of the second cycle of operations of the periodic signal producing means, the ground signal is removed from conductor H1 thereby releasing relay 730.

During the release of relay 730 the operation of relay 740 is effective for transferring the above traced holding circuit comprising make contacts 731 for the lower winding of relay 910 to a holding circuit which is dependent upon the transmission of a ground signal from the periodic signal producing means and transmitted to the final selector over conductor H2 through make contacts 333 and 742, break contacts 732, make contacts 911, and the lower winding of relay 910 to battery. It is to be noted that at the time that this transfer is effected by the release of relay 730 a ground signal is being transmitted over conductor H2 so that relay 910 is held steadily operated. During the third cycle of operations of the periodic signal producing means, the removal of the ground signal from conductor H2 is effective to open the last traced holding circuit for relay 910 which thereupon releases.

The release of relay 910 is effective for blocking the communication connection between the calling and called line by opening the communication channel at make contacts 811 and 815. Thereafter the final selector may be held in its operated condition under the control of the calling subscriber line. The release of relay 730 and the operation of relay 740 is also effective for extending a connection between conductor CWT and the lower winding of relay 550. During the third cycle of operation of the periodic signal producing means, means comprising hunt assist relay 550 is momentarily reoperated in order to connect a tone source to the conversation channel a specified time interval before the removal of ground from conductor H2 and the resulting release of relay 910. The connection between conductor CWT and the winding of relay 550 is traced through break contacts 547, make contacts 718, break contacts 736, make contacts 749_e_ and the lower winding of relay 550 to battery. The appearance of a ground signal on conductor CWT causes relay 550 to operate momentarily. The operation of relay 550 is effective for extending a connection from the grounded tone generator source through make contacts 451 and break contacts 443 and 432 to the communication channel comprising incoming conductors R1 and outgoing wiper R in order to inform the subscribers that the conversation is about to be blocked.

*Release of a connection*

Release of an established connection is initiated by the release of the final selector circuit which may take place at any time following the seizure of the final selector under the control of the calling subscriber. Upon the transmission of an on-hook signal from the calling subscriber station, such as A, well understood means in termination DOT causes the removal of the previously referred to short between conductors T and R, thereby opening the previously traced operating circuit of relay 120 and opening make contacts 121. The opening of make contacts 121 releases relay 220. Trunk delay relay 110 is also released at this time upon the opening of its operating circuit at make contacts 122.

The release of relay 220 opens the previously described operating circuits of relay 230 at make contacts 321 with the result that relay 230 releases. The release of relay 230 is effective for removing ground from conductor MG so that all of the previously described blocking circuits for relays such as 340, 510, 520, 530, 710 and 740 are opened to release those relays if they are in operated condition. Similarly, the holding circuits for relays 910 and 730 which include conductor MG are opened with the result that those relays also release. The release of relay 230 is also effective for opening the locking circuit for relay 750 at make contacts 331 so that relay 750 releases at this time, if it has been in operated condition.

The release of relay 230 is also effective for energizing the release magnets Z91 and MZ91 which are effective for restoring the wiper set comprising T, R, S and HS and the minor switch wiper set comprising MW91 and MW92, respectively, to their normal positions. The circuit is traced from ground through break contacts 543, 335 and 914, make contacts PON91 and SON91 in parallel, and the winding of magnet Z91 to battery; an obvious branch circuit including make contacts MON91 and the winding of magnet MZ91 to battery is also completed.

The release of relay 230 is also effective for removing ground from the incoming sleeve conductor S1 so that the well known means in the trunk circuit brings about the removal of a busy marking condition in terminations CDOT and DOT thereby freeing trunk line TWT and the final selector for further use.

EXTENSION OF A CALL FROM AN OPERATOR POSITION

In order to extend a call from an operator position, such as OP in the distant office, distance office termination DOT and community dial termination CDOT and the final selector are seized in the same manner as the one described in connection with the previous call from station A. Thereafter, the transmission of first, second and third directive signals to the final selector from position OP is effective in the previously described manner to advance the wiper set comprising T, R, S and HS into engagement with the required one of the terminal sets and for selecting the ringing code or frequency for use in signaling the called line.

The call extended from position OP is marked in termination CDOT as a call originating at a toll position by the fact that during the transmission of impulses an unbalanced condition is placed by well known means in termination DOT on conductors T and R so that unequal amounts of current flowing in the upper and lower windings of relay 130 during this interval allow differential relay 130 to operate. During the transmission of impulses termination shunt relay 150 is operated and held in operated condition owing to its slow release characteristics by the completion of a circuit from ground through break contacts 123, make contacts 111 and the winding of relay 150 to battery. The operation of relays 130 and 150 is effective for placing a battery signal on incoming conductor HS1 through resistor R11 and make contacts 131 and 151 thereby completing an operating circuit for toll marking relay 440. The latter circuit is traced from conductor HS1 through break contacts 216, make contacts 434, break contacts 653 and the upper winding of relay 440 to ground. The operation of relay 440 is effective for closing a locking circuit for itself from grounded conductor MG through make contact 446 and the lower winding of relay TL to battery.

The operation of relay 440 is effective at this time for rendering the previously described means for connecting the periodic signal producing means to the holding circuit of relay 910 ineffective by opening the operating circuit for the lower winding of relay 730 at break contacts 541, and for disconnecting the conductor CWT from the lower winding of relay 550 at break contacts 547. Under these conditions the means for releasing relay 910 to block conversation after a predetermined time interval has elapsed are no longer operative.

*Verification service*

The final selector forming the preferred embodiment of my invention is equipped with means for extending a toll connection from an operator position to a busy line in order to allow the operator in the connection to monitor. In order to carry out this type of service the operator transmits to the final selector a preliminary digit of a particular value. Means comprising level responsive wipers such as AW91 are advanced during the time that the wiper set is advanced in its primary direction in order to operate means comprising relay 740 for the recording of the preliminary verification digit and for thereafter causing the selector wiper set to drop back to its normal position. More particularly, the transmission of the preliminary digit to the final selector causes the advance of the wiper set in the previously described manner as well as an advance of auxiliary wiper AW91 over a corresponding auxiliary bank of terminals. Each terminal in the auxiliary bank represents the level to which the wiper set comprising T, R, S and HS has been advanced. Thus, assuming that the preliminary signal for verification service is the digit "0" the advance of the wiper AW91 to the tenth level is effective at the conclusion of the train of impulses as indicated by the release of relay 340 for closing an operating circuit for relay 740. The circuit is traced from grounded conductor MG through break contacts 346, conductor BV, the level marking terminal, auxiliary wiper AW91, the lower winding of relay 740 and break contacts Z71 to battery.

The operation of relay 740 is effective for opening the previously described alternate holding circuit for relay 530 at break contacts 749*a*. Relay 530 thereupon releases.

The release of relay 530 and the operation of toll marking relay 440 are effective for closing an energizing circuit for the release magnet in order to restore the wiper set as well as the auxiliary wipers to their normal positions. The circuit is traced from grounded conductor MG through break contacts SON52, make contacts 542, break contacts 533, make contacts 334, break contacts 914 and now operated make contacts PON91, and the winding of magnet Z91 to battery.

The restoration of the wiper set and the auxiliary wipers to their normal positions is effective for restoring the primary off-normal contacts to their normal conditions. Thus, the operation of relay 740 and the restoration of the off-normal contacts is effective for reoperating primary delay relay 340 over the previously described circuit and for operating ring trip repeater relay 710 over the following circuit: from grounded conductor MG through make contacts 749, break contacts PON71 and the winding of relay 710 to battery. Relay 710 thereupon operates and closes an obvious locking circuit for itself through make contacts 716.

The operation of relays 710 and 740 is effective for recompleting an energizing circuit for now released relay 530. This circuit is traced from grounded conductor MG, through make contacts 717, 749*b*, and 524, and the winding of relay 530 to battery.

Thereafter, first, second and third digits for operating the wiper set through its primary and secondary motions and the ringing selecting means are transmitted into the final selector which operates in the previously described manner, except that upon the release of relay 520 and the opening of the previously described holding circuit for relay 530 at make contacts 524, relay 530 is not released because another holding circuit is established owing to the operation of relays 440 and 740. The latter circuit is traced from grounded conductor MG through make contacts 748 and 544, break contacts 525, and the winding of relay 530 to battery.

The continued holding of relay 530 throughout the duration of the verification connection connects the busy test relay 750 continuously to the sleeve conductor through the previously traced operating circuit for relay 750. Relay 750 is therefore effective to detect a busy condition as indicated by the presence of ground on conductor S2 and operates under busy conditions on the called line to operate supervisory relay 140 in termination CDOT by extending a connection from battery through resistor R61, make contacts 654 and 434, break contacts 216 and 152 and the lower windings of relay 140 to ground. The operation of relay 140 is effective in the previously described manner to pass back off-hook supervision over trunk line TWT. Should the line become idle during the time that the verification connection is extended, the ground on the sleeve terminal to which wiper S has been extended is removed so that relay 750 is released to open the previously traced energizing circuits for relay 140 at make contacts 654. Thereafter on-hook supervision is transmitted to line TWT.

At the conclusion of dialing first, second and third directive signals into the final selector in the case of a verification call, the operation of relays 440 and 740 and the subsequent release of relay 520 are effective for establishing an alternate connection between the previously mentioned communication channel comprising blocking capacitors C21 and C22 of the selector and wipers T and R which are now connected to the called line. The circuit comprises break contacts 421 and 422 on relay 520, make contacts 441 and 444 on relay 440, and make contacts 641 and 643 on relay 740.

In order to prevent battery and ground connections from being extended through the windings of relay 210 into an established connection on the line terminals being verified, the switchthrough relay 910 is prevented from being operated. The previously described operation of relay 710 is effective for opening the operating circuit of relay 910 at break contacts 711 in order to carry out this operation. The failure to operate of relay 910 is effective for isolating from the verification connection the lower battery feed winding of relay 210 at make contacts 816. In order to remove the effectiveness of the upper winding of relay 210, ground is removed from its lefthand terminal by the operation of relay 440 at break contacts 442 and the now operated break contacts 431 of operated relay 530.

In order to extend a verification connection to any one of one of the groups of lines over which the final selector is to normally trunk hunt in the previously described manner, it is necessary for the means responsive to the transmission of preliminary digits to render the trunk hunting means inoperative. This disabling operation is brought about by the operation of relay 710 which is effective for opening the previously described circuit comprising the winding of hunt assist relay 550. The operation of relay 710 opens the previously described connection between wiper HS and the upper winding of relay 550 at break contacts 713.

Thus, when the wiper set is placed in engagement with the busy terminal set having a strap between the S and HS terminals, the previously described stepping circuit is ineffective to advance the wiper set into engagement with the next succeeding one of the terminal sets in the group of private branch exchange line terminals and the verification connection is completed to the selected one of the private branch exchange line terminal groups in the above described manner.

*Release of a connection*

The wiper set comprising T, R, S and HS is restored to its normal position and the wipers of the frequency selecting minor switch are restored to their normal position in the previously described manner. In addition to the restoring of the final selector relays described in connection with a call extended from station A, the removal of ground from conductor MG at make contacts 232 is effective for opening the previously described locking circuits for those relays, thereby releasing relays 740 and 530 to open the operating circuits of relay 750 at make contacts 436. The circuit is in normal condition and ready for use in extending other calls.

While I have shown and described a particular embodiment of my invention, it will be obvious to those skilled in the art that changes and modifications may be made without departing from my invention in its broader aspects. I therefore aim, in the appended claims, to cover all such changes and modifications as fall within the true spirit and scope of my invention.

What is claimed is:

1. In a telephone system, a line of a first class, a line of a second class, a selector comprising a set of wipers, means for extending connections from a calling one of said lines to said selector, a plurality of terminal sets disposed for engagement by said wipers set, each of said terminal sets being capable of being placed in an idle and a busy condition, certain successive ones of said terminal sets being arranged in a group, means responsive to a directive signal transmitted to said selector from a calling one of said lines for selectively advancing said wiper set into engagement with any one of said terminal sets, a first path including said wiper set for extending a connection between said selector and a selected one of said terminal sets, means responsive to an idle condition on the selected one of said terminal sets for completing said first path, means normally effective in response to a busy condition on the selected one of said terminal sets for rendering said first path completing means inoperative, a second path including said wiper set for extending a connection from said selector to a selected one of said terminal sets in busy condition, means responsive to the transmission of a preliminary directive signal to said selector for preparing said second path, means effective upon the transmission of directive signals to said selector from said first class line only for rendering said preliminary signal responsive means effective, other means operative in response to a busy condition on the first or an intermediate one of said group of terminal sets for causing said advancing means to advance said wiper set into engagement with the next succeeding terminal set of said group, and means operative in response to the operation of said preparing means for rendering said other means ineffective.

2. In a telephone system, a line of a first class, a line of a second class, a selector, means for extending a connection from a calling one of said lines to said selector, said selector comprising a set of wipers having a normal position and including a first, a second and other wipers, a plurality of terminal sets disposed for engagement by said wipers, each of said terminal sets including a first, a second and other terminals to be engaged by said first, said second and said other wipers respectively, each of said first terminals being effective for indicating busy conditions by the presence of a particular potential or an idle condition, certain successive ones of said terminal sets being arranged in a group, each of said first and said intermediate terminal sets in said group being indicated by a connection between the corresponding one of said first and said second terminals, means in said selector operative in response to the transmission of directive signals from the calling one of said lines for selectively advancing said wiper set into engagement with any one of said terminal sets, first path including said other wipers for extending a connection from said selector to said other terminals of the selected one of said terminal sets, means responsive to an idle condition on said first terminal of the selected one of said terminal sets for completing said first path, means normally responsive to a busy condition on said first terminal of the selected one of said terminal sets for rendering said first path completing means ineffective, a second path including said other wipers for extending a connection from said selector to said other terminals of the selected one of said terminal sets, means operative in response to the transmission of a preliminary directive signal to said selector for preparing said second path, means effective upon the transmission of directive signals to said selector from said first class line only for rendering said preliminary signal responsive means effective, a circuit comprising said second wiper completed by the operation of said busy condition responsive means and said connection between said first and said second terminals of a selected one of said group of terminal sets for operating said advancing means to advance said wiper set from a busy to the next succeeding one of said group of said terminal sets, and means operative in response to the operation of said second path preparing means for opening said circuit to prevent the advance of said wiper set.

3. In a telephone system, a plurality of terminal sets capable of being placed in idle and busy conditions disposed in a plurality of levels, certain successive ones of said terminal sets within any one of said levels being arranged in a group, a selector comprising a wiper set having a normal position and capable of movement in primary and secondary directions, a line, means for extending connection from said line to said selector, means responsive to a first directive signal transmitted from said line to said selector for selectively advancing said wiper set in its primary direction to any one of said levels, means responsive to a second directive signal for selectively advancing said wiper set in its secondary direction into engagement with any one of said terminal sets within the selected one of said levels, means responsive to an idle condition on the selected one of said terminal sets for extending a connection from said selector to the selected one of said terminal sets, means responsive to a busy condition on the selected one of said terminal sets for rendering said connection extending means inoperative, other means operative in response to a busy condition on one of said terminal sets within said group for causing said secondary direction advancing means to advance said wiper set into engagement with the next succeeding one of said terminal sets within said group, means operative in response to the transmission of a preliminary signal to said selector for preparing said selector to extend thereafter a connection from said selector to a busy one of said terminal set, and means operative in response to the operation of said preparing means for rendering said other means ineffective.

4. In a telephone system, a plurality of terminal sets capable of being placed in idle and busy conditions disposed in a plurality of levels, certain successive ones of said terminal sets within any one of said levels being arranged in a group, a selector comprising a wiper set having a normal position and capable of movement in primary and secondary directions, a line of a first class, a line of a second class, means for extending a connection from a calling one of said lines to said selector, means responsive to a first directive signal transmitted from the calling one of said lines to said selector for selectively advancing said wiper set in its primary direction to any one of said levels, means responsive to a second directive signal for selectively advancing said wiper set in its secondary direction into engagement with any one of said terminal sets within the selected one of said levels, a first path including said wiper set for extending a connection between said selector and a selected one of said terminal sets, means responsive to an idle condition on the selected one of said terminal sets for completing said first path, means normally effective in response to a busy condition on the selected one of said terminal sets for rendering said first path completing means inoperative, a second path including said wiper set for extending a connection from said selector to a selected one of said terminal sets in busy condition, means operative in response to the transmisison of a preliminary directive signal to said selector for preparing said second path, means for restoring said wiper set from an operated to said normal position, said second path preparing means being effective for operating said releasing means, means effective upon the transmission of directive signals to said selector from said first class of lines only for rendering said preliminary signal responsive means effective, other means operative in response to a busy condition on said first or an intermediate one of said group of terminal sets for causing said advancing means to advance said wiper set into engagement with the next succeeding terminal set of said group, and means operative in response to the operation of said second path preparing means for rendering said other means ineffective.

5. In a telephone system, a plurality of terminal sets disposed in a plurality of levels, each of said terminal sets including a first, a second and other terminals, each of said first terminals being effective for indicating a busy condition by the presence of a particular potential for an idle condition, certain successive ones of said terminal sets within any one of said levels being arranged in a group, each of the first and intermediate terminal sets in said group being characterized by a connection between the corresponding ones of said first and said second terminals, a selector comprising a wiper set having a normal position and capable of movement in primary and secondary directions, said wiper set comprising a first, a second and other wipers for engaging said first, said second and said other terminals, respectively, of said terminal sets, a line of a first class, a line of a second class, means for extending a connection from a calling one of said lines to said selector, means responsive to a first directive signal transmitted from said line to said selector for selectively advancing said wiper set in its primary direction to any one of said levels, means responsive to a second directive signal for selectively advancing said wiper set in its secondary direction into engagement with any one of said terminal sets within the selected one of said levels, a first path including said other wipers for extending a connection from said selector to said other terminals of the selected one of said terminal sets, means responsive to an idle condition on said first terminal of the selected one of said terminal sets for completing said first path, means normally responsive to a busy condition on said first terminal of the selected one of said terminal sets for rendering said first path completing means ineffective, a second path including said other wipers for extending a connection from said selector to said other terminals of the selected one of said terminal sets, means operative in response to the transmission of a preliminary directive signal to said selector for preparing said second path, means for restoring said wiper set to said normal position, means operative in response to the operation of said preparing means for operating said restoring means, means effective upon the transmission of directive signals to said selector from said first class of lines only for rendering said preliminary signal responsive means effective, a circuit comprising said second wiper completed by the operation of said busy condition responsive means and said connection between said first and said second terminals of a selected one of said terminal sets for operating said secondary advancing means to advance said wiper set from a busy to the next succeeding one of said group of terminal sets, and means operative in response to the operation of said second path preparing means for opening said circuit to prevent the further secondary advance of said wiper set.

References Cited in the file of this patent

UNITED STATES PATENTS

| | | |
|---|---|---|
| 1,829,799 | Hatton et al. | Nov. 3, 1931 |
| 1,950,877 | Belas | Mar. 13, 1934 |
| 2,253,218 | Wirth | Aug. 19, 1941 |
| 2,337,365 | Bakker | Dec. 21, 1943 |
| 2,377,453 | Rhoads | June 5, 1945 |
| 2,479,276 | Taylor et al. | Aug. 16, 1949 |
| 2,542,272 | Bakker | Feb. 20, 1951 |
| 2,791,636 | Pharis | May 7, 1957 |